United States Patent [19]

Smart

[11] Patent Number: 4,956,658

[45] Date of Patent: Sep. 11, 1990

[54] FILM THREADING APPARATUS

[75] Inventor: David C. Smart, Rochester, N.Y.

[73] Assignee: Eastman Kodak Company, Rochester, N.Y.

[21] Appl. No.: 379,752

[22] Filed: Jul. 14, 1989

[51] Int. Cl.$^5$ .................. G03B 17/28; G03B 17/30
[52] U.S. Cl. ................................ 354/212; 354/21; 354/203; 354/206
[58] Field of Search .............. 354/275, 212, 213, 203, 354/206, 215; 242/71.1, 71

[56] References Cited

U.S. PATENT DOCUMENTS

| | | | |
|---|---|---|---|
| 1,260,357 | 3/1918 | Folmer | 430/501 |
| 2,336,278 | 12/1943 | Mihalyi | 354/212 |
| 3,479,938 | 11/1969 | Winkler et al. | 354/212 |
| 4,132,473 | 1/1979 | Kondo | 354/203 |
| 4,324,476 | 4/1982 | Seeley | 354/288 |
| 4,455,076 | 6/1984 | Birkeland | 354/275 |

Primary Examiner—L. T. Hix
Assistant Examiner—Cassandra C. Spyrou
Attorney, Agent, or Firm—Roger A. Fields

[57] ABSTRACT

In a photographic camera adapted for use with a film cassette containing a non-protruding film leader which can be automatically propelled out of the cassette, a pair of film guide members are fixed along opposite sides of a film threading path leading from a receiving chamber for the cassette. The film leader is wider than the substantial remainder of the filmstrip, and the film guide members are spaced apart a predetermined distance which is slightly less than the leader and slightly greater than the remaining length of the filmstrip, to cause the leader to be transversely bowed as it is propelled between the fixed guide members. When the film leader is transversely bowed, it becomes longitudinally stiffened to prevent it from being snagged along the film threading path.

2 Claims, 7 Drawing Sheets

FILM THREADING APPARATUS

CROSS-REFERENCE TO RELATED APPLICATIONS

Reference is made to the following commonly assigned copending applications: Serial No. 185,001, now Pat. No. 4846418 entitled FILM CASSETTE, and filed Apr. 22, 1988, in the name of Patricia D. Fairman; Serial No. 379744 [our Docket No. 54,785], entitled CONTROL APPARATUS FOR FILM PRESSURE PLATE IN CAMERAS, and filed July 14, 1989, in the name of David E. Beach; and Serial No. 379748 now Pat. No. [our Docket No. 54,522], entitled PHOTOGRAPHIC CAMERA WITH FILM THREADING APPARATUS, and filed July 14, 1989, in the name of David C. Smart.

BACKGROUND OF THE INVENTION

1. Field of the Invention

The invention relates generally to the field of photography, and particularly to a film threading apparatus for a photographic camera.

2. Description of the Prior Art

In conventional 35mm film manufacturers' cassettes, such as manufactured by Eastman Kodak Company and Fuji Photo Film Co. Ltd., the filmstrip is wound on a flanged spool which is rotatably supported within a cylindrical shell. A leading portion of the filmstrip approximately 2 ½ inches long, commonly referred to as a "film leader", protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader portion protruding from the slit will remain stationary. The film roll can expand radially until a non-slipping relation is established between its outermost convolution and the inner curved wall of the shell. Once this non-slipping relation exists, there is a binding effect between the film roll and the shell which prevents further rotation of the spool in the unwinding direction. Consequently, rotation of the spool in the unwinding direction cannot serve to advance the filmstrip out of the shell, and it is necessary in the typical 35mm camera to wind the protruding leader portion onto a film take-up drum in order to draw the filmstrip out of the shell. Since the protruding leader portion is usually laid over the exposure (back frame) opening in the camera during film loading, it is not uncommon to retract the film pressure plate (for holding each successive film frame flat at the exposure opening) preparatory to winding the leader portion onto the take-up drum. See U.S. Pat. Nos. 4,525,051; 4,505,562; 3,563,144; 2,753,777; and 2,336,279.

A 35mm film cassette has been proposed which, unlike conventional film cassettes, can be operated to automatically advance the filmstrip out of the cassette shell by rotating the film spool in the unwinding direction. The leader portion normally does not protrude from the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner curved wall of the cassette shell. The trailing end of the filmstrip is secured to the film spool, and the leading end of the filmstrip is slightly tapered along one longitudinal edge purportedly to allow it to freely extend from between the circumferential lips and rest against the shell wall. During initial unwinding rotation of the film spool, the leading end of the filmstrip is advanced along the shell wall until it reaches an entry to a film passageway in the cassette shell. Then, it is advanced into and through the film passageway to the outside of the cassette shell. The passageway has a width that is slightly less than the width of the filmstrip, thus resulting in the filmstrip being transversely bowed as it is uncoiled from the film spool, and thereby facilitating movement of the film edges under the circumferential lips of the respective flanges.

While the film cassette disclosed in U.S. Pat. No. 4,423,943 includes a non-protruding film leader which is automatically advanced to the outside of the cassette shell when the film spool is rotated in the unwinding direction, the film cassette is intended to be loaded in a camera only after the film leader is advanced to protrude from the cassette shell. In the patent, it is suggested that one manually rotate the film spool relative to the cassette shell until the leader portion can be manually grasped and attached to a film advancing device in the camera.

THE CROSS-REFERENCED APPLICATIONS

Cross-referenced application Serial No. 185,001 now Pat. No. 4846418 discloses a film cassette in which a film spool can be rotated to unwind a filmstrip off the spool to automatically thrust a non-protruding leader portion of the filmstrip out of the cassette. The ability of the film cassette to thrust the leader portion outwardly enables the leader portion to be propelled in a camera from the cassette, across an exposure (back frame) opening, to a film take-up means.

Cross-referenced application Serial No. [our Docket No. 54,785] discloses a camera adapted for use with a film cassette in which a film spool is rotatable to unwind a filmstrip off the spool to automatically thrust a non-protruding leader portion of the filmstrip from the cassette to enable the leader portion to be propelled in the camera over an exposure opening and to a film take-up means. The filmstrip including the leader portion has a natural tendency to curve slightly crosswise In the camera, a pressure plate is resiliently biased to an operative position for pressing the filmstrip flat at the exposure opening. A restraining device is operated to hold the pressure plate in a retracted Position removed from the exPosure opening. This permits the filmstrip to assume its natural cross-curvature in order to increase the longitudinal strength of the leader portion to facilitate its being propelled over the exposure opening and to the film take-up means resPonsive to unwinding rotation of the film spool. When the filn strip is taken up at the take-up means, the restraining device releases the pressure plate for movement to its operative position.

Cross-referenced application Serial No. 379748 now Pat. No. [our Docket No. 54,522] discloses a camera adapted for use with a film cassette containing a non-protruding film leader which can be automatically propelled out of the cassette. In the camera, a pair of film guide members are located along oPposite sides of a film advance path leading from a receiving chamber for the cassette to a film take-up means. The guide members are movable closer together to transversely bow the film leader to thereby increase the longitudinal stiffness of the leader to facilitate its being propelled along the film advance path without being snagged. When the film leader is secured to the film take-up means, the guide members are moved slightly apart to permit a film pressure plate to flatten successive imaging areas of the filmstrip preparatory to taking each Picture.

SUMMARY OF THE INVENTION

According to the invention, there is Provided a film threading apparatus for a photographic camera to be used with a film cassette including a film spool rotatable to unwind a filmstrip off the spool to automatically thrust a non-protruding relatively wider leader portion of the filmstrip out of the cassette to enable the leader portion to be propelled in the camera along a film threading path leading from a receiving chamber for the cassette, said film threading apparatus comprising:

a pair of film guide members fixed along opposite sides of the film threading path, said fixed guide members being spaced apart a predetermined distance measured across the film threading path which is slightly less than the width of the leader portion and slightly greater than the width of the substantial remainder of the filmstrip to bow the leader portion widthwise, but not the remainder of the filmstrip, to thereby significantly increase the longitudinal stiffness of the leader portion to facilitate its being propelled along the film threading path responsive to unwinding rotation of the film spool.

DETAILED DESCRIPTION OF THE PREFERRED EMBODIMENT

The invention is disclosed as being embodied preferably in a 35mm still camera. Because the features of this type of camera are generally well known, the description which follows is directed in particular to elements forming part of or cooPerating directly with the disclosed embodiment. It is to be understood, however, that other elements not specifically shown or described may take various forms known to persons of ordinary skill in the art.

The film Cassette

Figure 1:
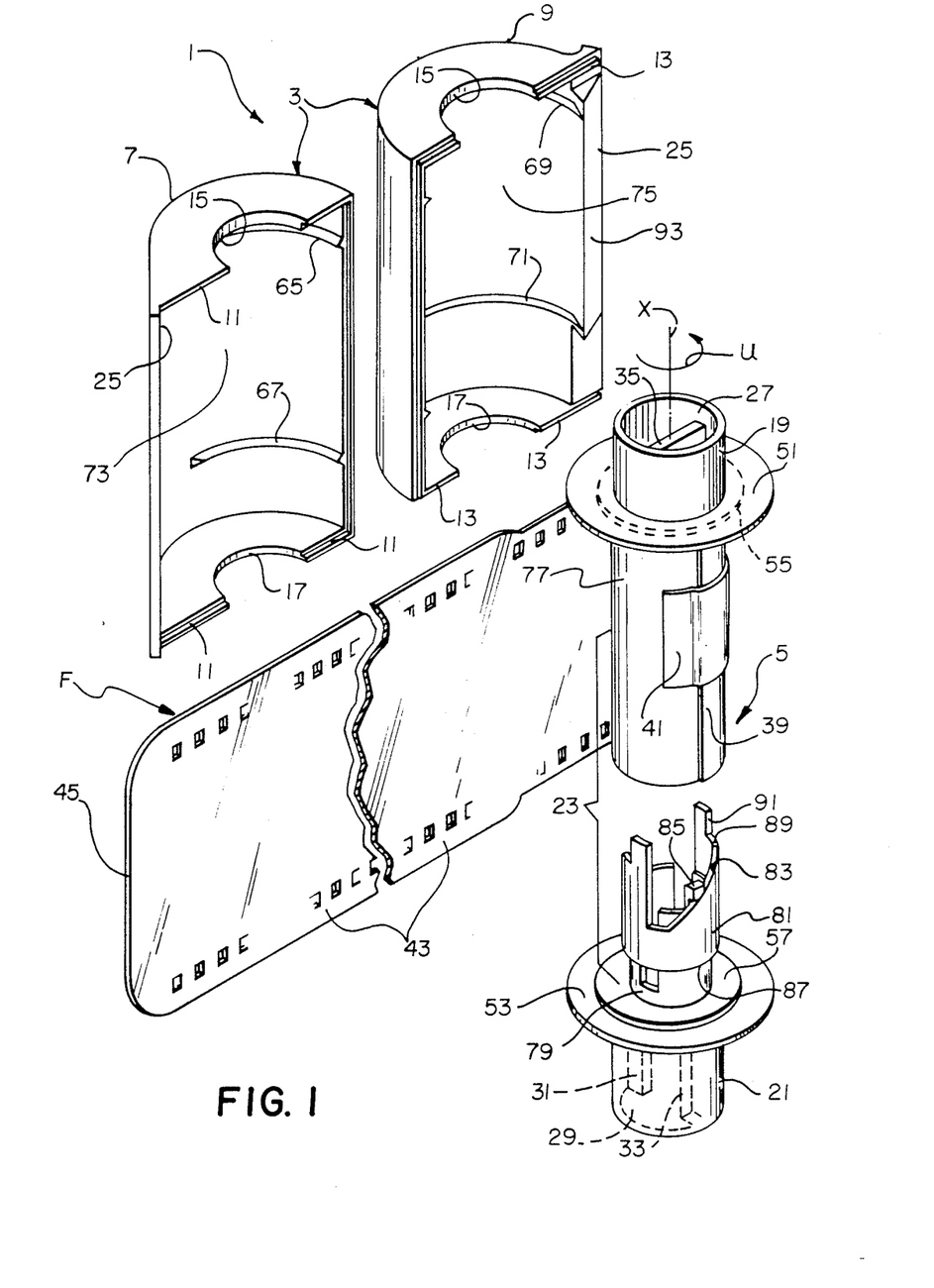
FIG. 1 is an exploded perspective view of a film cassette similar in certain respects to the one disclosed in cross-referenced application Serial No. 185,001, now Pat. No. 4846418 illustrating the two halves of a cassette shell and a film spool on which is wound a 35mm filmstrip having a wider film leader.
Figure 2:
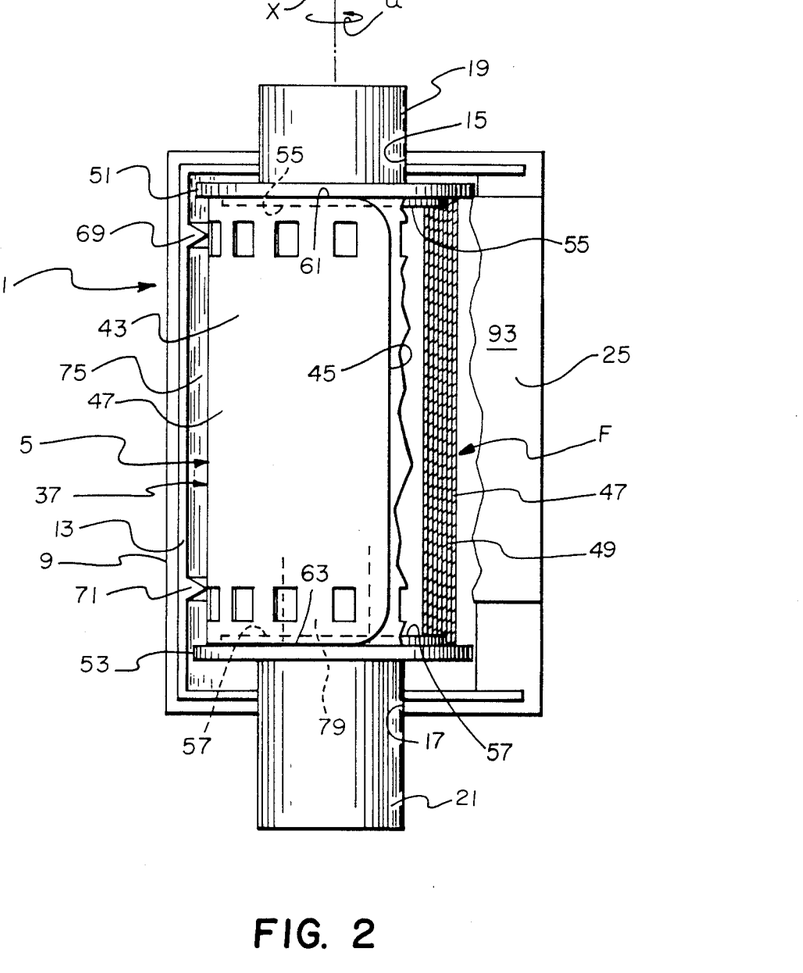
FIG. 2 is an elevation view partly in cross-section of the film cassette, illustrating the film spool, the filmstrip, and one-half of the cassette shell.
Figure 3:
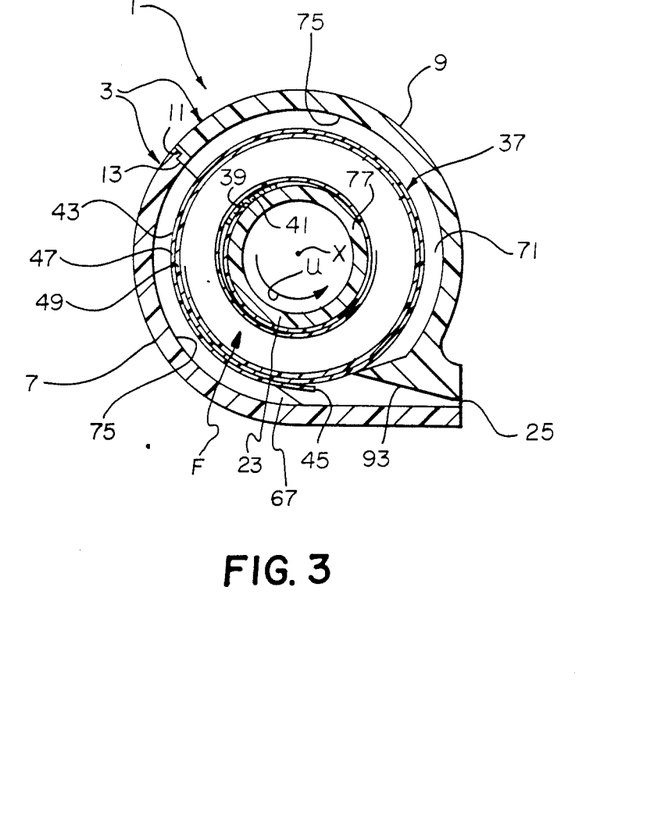
FIG. 3 is an end view in cross-section of the film cassette.

Referring now to the drawings, FIGS 1-3 depict a 35mm film cassette 1 comPrising a light-tight cassette shell 3 and a film spool 5 rotatable about an axis X within the cassette shell. The cassette shell 3 consists of two shell halves 7 and 9 which are mated along respective stepped edge portions 11 and 13. The mated halves 7 and 9 define upper and lower aligned openings 15 and 17 for upper and lower opposite end extensions 19 and 21 of a spool core or hub 23. Also, they define a light-trapped film passage slit or mouth 25. The light-trapping means for preventing ambient light from entering the film passage slit 25, although not shown, may be a known flocking or plush material which lines the interior of the slit. One example of such a material is illustrated in U.S. Pat. No. 4,407,579.

The spool core 23 as shown in FIG. 1 includes upper and lower coaxial holes 27 and 29 opening at the upper and lower opposite end extensions 19 and 21 of the spool core. A pair of spaced keying ribs 31 and 33 integrally formed with the spool core 23 are located within the lower coaxial hole 29, and a single keying rib 35 similarly formed with the spool core is located within the upper coaxial hole 27. The several keying ribs 31, 33, and 35 according to custom may be engaged by a drive spindle in a camera to rotate the film spool in an unwinding direction indicated bY the arrow U in FIG. 1, or to rotate the spool in a winding direction opposite to the unwinding direction.

Figure 5:
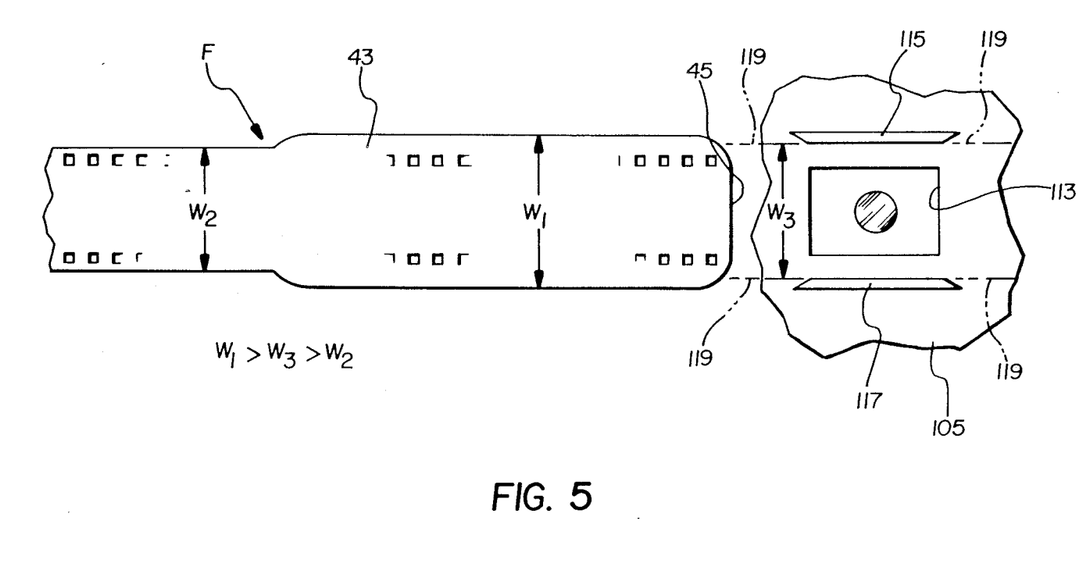
FIG. 5 is a schematic view of the relationship between the wider film leader and the film threading apparatus.

A roll of 35mm filmstrip F is wound about the spool core 23. As indicated in FIGS. 1 and 3, the film roll 37 has an inner or trailing end 39 attached to the spool core 23 by a suitable piece of adhesive tape 41 and it has a film leader 43. The film leader 43 has a tapered leading or forward end 45 and comprises two convolutions of the film roll 37. One of these leader convolutions is the outermost convolution 47 and another of them is the next inward succeeding convolution 49. See FIGS. 2 and 3. As indicated in FIG. 5, the film leader 43 has a width $W_1$ that is greater than the width $W_2$ of the remainder of the filmstrip F A pair of identical flanges 51 and 53 radially extend from the spool core 23 and include lesser diameter integral disks 55 and 57 on their respective undersides. See FIG. 1. The upper and lower flanges 51 and 53 (in FIG. 1) are coaxially spaced to locate their lesser diameter disks 55 and 57 adjacent opposite sides 61 and 63 of the film roll 37, except that the two convolutions 47 and 49 comprising the wider leader 43 are wound about the peripheral edges of the respective disks. See FIG. 2.

The maximum diameter of the film roll 37 is restricted to a value less than the diameter of the two flanges 51 and 53 by two pairs of arcuate ribs 65, 67 and 69, 71, fixed to the two halves 7 and 9 of the cassette shell 3 at their respective inner walls 73 and 75. The four ribs 65, 67, 69, and 71 protrude radially between the two flanges 51 and 53 to circumferentially confine the outermost convolution 47 of the wider leader 43 to thereby prevent the outermost convolution from radially expanding or clock-springing beyond the Peripheries of the flanges to the shell walls 73 and 75. See FIGS. 1 and 2. Preferably, the respective ribs 65, 67, 69, and 71 are relatively smooth at their respective areas of contact with the outermost convolution 47.

As shown in FIG. 1, the spool core 23 is comprised of two hollow cylindrical coaxial pieces 77 and 79. the first spool piece 77 is integrally formed with the upper flange 51 and the second piece 79 is integrally formed with the lower flange 53. An annular fixed insert 81 secured to the inside of the first spool piece 77 (or integrally formed therewith) is constructed to telescopically receive the second spool piece 79 in order to vary the axial distance between the upper and lower flanges 51 and 53. The specific means for varying the axial distance between the two flanges 51 and 53 consists of an inclined cam edge or ramp 83 located on the annular insert 81 and a cam follower tab 85 located on the second spool piece 79.

If the second spool piece 79 is initially rotated relative to the first spool piece 77 (including its annular insert 81) in the unwinding direction U, the interaction between the cam edge 83 and the follower tab 85 will cause the second spool piece to be further received within the annular insert, i.e. the second spool piece will be moved axially toward the first spool piece, thereby reducing the axial distance between the two flanges 51 and 53. The second spool piece 79 can be moved axially toward the first spool piece 77 until the integral disk 57 of the lower flange 53 is moved into a firm compressive relation with the one side 63 of the film roll 37. At this time, the integral disk 57 of the lower flange 53 preferably is disposed in abutment against a lower edge 87 of the annular insert 81. See FIG. 1. Moreover, the follower tab 85 will have come to rest atop a plateau edge 89 and alongside a stop edge 91 of the annular insert 81. The stop edge 91 serves to Prevent continued rotation of the second sPool piece 79 relative to the first spool 77 (including its annular insert 81) in the unwinding direction U, thereby causing further rotation of the second spool piece in the unwinding direction to similarly rotate the first spool piece. The plateau edge 89 serves to trap the follower tab 85 in order to secure the integral disk 57 of the lower flange 53 in its compressive relation with the one side 63 of the film roll 37.

If the second spool piece 79 is rotated in a winding direction opposite to the unwinding direction U after its follower tab 85 has come to rest atop the plateau edge 89, the follower tab will be moved off the plateau edge. Thus, the integral disk 57 of the lower flange 53 will no longer be secured in its compressive relation with the one side 63 of the film roll 37.

When the second spool Piece 79 is initially rotated relative to the first spool piece 77 (including its annular insert 81) in the unwinding direction U, the interaction between the cam edge 83 of the annular insert and the follower tab 85 of the second spool piece will cause the integral disks 55 and 57 of the respective flanges 51 and 53 to firmly clamp the film roll 37 at its opposite sides 61 and 63. The two convolutions 47 and 49 comprising the wider leader 43 will be transversely pinched between the two flanges 51 and 53. As a result, the tapered leading end 45 of the wider leader 43 will tend to straighten longitudinally and therefore will slightly separate or lift off the outermost convolution 47. However, the four ribs 65, 67, 69, and 71 prevent the leading end 45 from contacting the shell walls 73 and 75.

Continued rotation of the second spool piece 79 in the unwinding direction U will similarly rotate the first spool piece 77. Moreover, the film roll 37 will be rotated in the unwinding direction U to advance the tapered leading end 45 of the wider leader 43 to a stripper-guide 93 integrally formed with the cassette half 7 The stripper-guide 93 then will strip the leading end 45 of the wider leader 43 from between the two flanges 51 and 53 and guide it through the film passage slit 25 to the outside of the cassette shell 3. Since the integral disks 55 and 57 of the respective flanges 51 and 53 firmly clamp the film roll 37, sufficient film thrust is provided to propel the wider leader 43 Past the stripper-guide 93 and comPletely out of the cassette shell 3.

The Photographic Camera—Film Threading Apparatus

Figure 4:
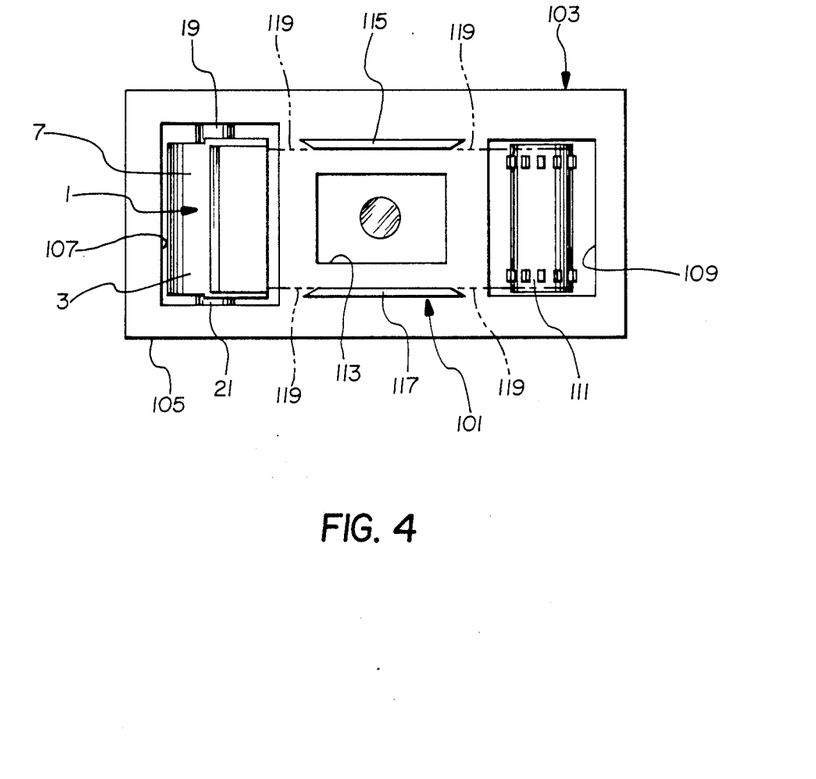
FIG. 4 is a rear elevation view of a camera including a film threading apparatus to be used with the film cassette, according to a preferred embodiment of the invention.

Referring now to FIG. 4, a film threading apparatus 101 for a photographic camera 103 is depicted for use with the film cassette 1. The camera body 105 as is typical includes a receiving chamber 107 for the film cassette 1; a film take-up chamber 109 in which is rotatably supported a film take-up drum 111; and an exposure (back frame) opening 113 positioned midway between the two chambers.

Figure 6:
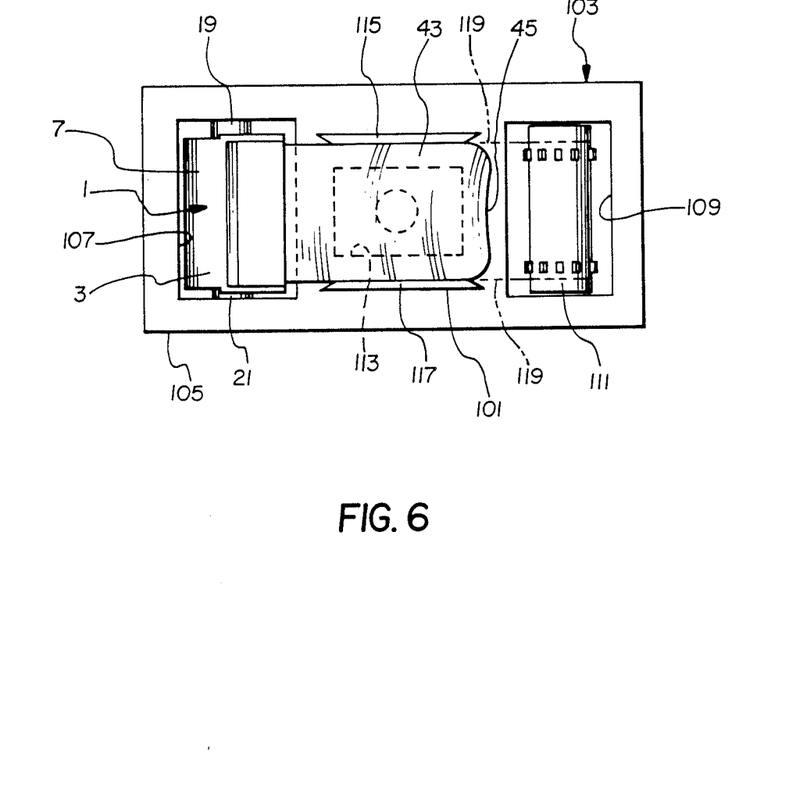
FIGS. 6 and 7 are near elevation views similar to FIG. 4, showing successive stages of film advancement from the film cassette.
Figure 7:
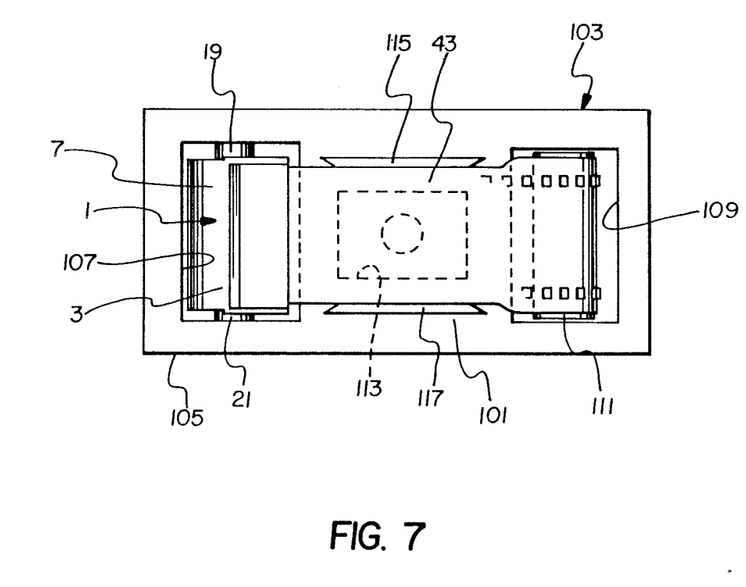

According to the invention, a pair of elongate film guide members 115 and 117 are fixed along opposite longitudinal sides of a film threading path 119 leading from the receiving chamber 107 for the film cassette 1, over the exposure opening 113, and to the film take-up chamber 109. As shown in FIG. 5, the two fixed guide members 115 and 117 are spaced apart a predetermined distance $W_3$ measured across the film threading path 119 which is slightly less than the width $W_1$ of the film leader 43 and slightly greater than the width $W_2$ of the remainder of the filmstrip F. When the wider leader 43 is propelled out of the cassette shell 3 as shown in FIG. 6, its tapered leading end 45 will be fed between the two fixed guide members 115 and 117 which, in turn, bow the leader widthwise to thereby significantly increase its longitudinal stiffness to facilitate its being propelled along the film threading path 119, over the exposure opening 113, and onto the film take-up drum 111. Once the entire leader 43 is wound on the take-up drum 111, the remainder of the filmstrip F will readily pass between the fixed guide members 115 and 117 without being bowed widthwise since the width $W_2$ of the film remainder is less than the distance $W_3$ between the two guide members.

The invention has been described with reference to a preferred embodiment. However, it will be appreciated that variations and modifications can be effected within the ordinary skill in the art without departing from the scope of the invention.

I claim:

1. An improved photographic camera wherein a film threading path leads from a receiving chamber for a film cassette including a film spool rotatable to unwind a filmstrip off the spool to automatically thrust a non-protruding relatively wider leader portion of the filmstrip out of the cassette to enable the leader portion to be propelled along said film threading path, and wherein the improvement to said camera comprises:

a pair of elongate film guide members fixed lengthwise along opposite sides of the film threading path, aid fixed guide members being spaced apart a predetermined distance measured across the film threading path which is slightly less than the width of the leader portion and slightly greater than the width of the substantial remainder of the filmstrip to bow the leader portion across its width, but not the remainder of the filmstrip, to thereby significantly increase the longitudinal stiffness of the leader portion to facilitate its being propelled along the film threading path responsive to unwinding rotation of the film spool.

2. An improved photographic camera wherein a film threading path across an exposure opening leads from a receiving chamber for a film cassette including a filmstrip having a relatively wider leader portion that can be propelled along said film threading path, and wherein the improvement to said camera comprises:

a pair of elongate film guide members fixed along opposite sides of the film threading path at the exposure opening, said fixed guide members being spaced apart a predetermined distance measured across the film threading path which is slightly less than the width of the leader portion and slightly greater than the width of the substantial remainder of the filmstrip to bow the leader portion entirely across its width, but not the remainder of the filmstrip, to thereby significantly increase the longitudinal stiffness of the leader portion to facilitate its being propelled along the film threading path including the exposure opening.

* * * * *